United States Patent
Soga

(10) Patent No.: US 8,171,012 B2
(45) Date of Patent: May 1, 2012

(54) DOCUMENT MANAGEMENT APPARATUS, METHOD, SYSTEM, MEDIUM STORING A PROGRAM THEREOF

(75) Inventor: Masaya Soga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 12/368,088

(22) Filed: Feb. 9, 2009

(65) Prior Publication Data

US 2009/0204589 A1    Aug. 13, 2009

(30) Foreign Application Priority Data

Feb. 12, 2008    (JP) ............................... 2008-031028

(51) Int. Cl.
G06F 17/30    (2006.01)

(52) U.S. Cl. ........................... 707/710; 707/715

(58) Field of Classification Search .......... 707/705–728, 707/748–754, 765–773
See application file for complete search history.

(56) References Cited

U.S. PATENT DOCUMENTS

| | | | |
|---|---|---|---|
| 7,003,442 B1 | 2/2006 | Tsuda | 704/9 |
| 2002/0038342 A1* | 3/2002 | Ito | 709/203 |
| 2005/0091191 A1* | 4/2005 | Miller et al. | 707/1 |
| 2005/0256867 A1* | 11/2005 | Walther et al. | 707/5 |
| 2006/0143175 A1* | 6/2006 | Ukrainczyk et al. | 707/6 |
| 2006/0167942 A1* | 7/2006 | Lucas et al. | 707/104.1 |
| 2008/0168048 A1* | 7/2008 | Bell et al. | 707/5 |

FOREIGN PATENT DOCUMENTS

| | | |
|---|---|---|
| JP | 2000-10996 | 1/2000 |
| JP | 2006-72705 | 3/2006 |

* cited by examiner

*Primary Examiner* — Wilson Lee
(74) *Attorney, Agent, or Firm* — Fitzpatrick, Cella, Harper & Scinto

(57) ABSTRACT

A document management apparatus that searches at least one document group saved in advance for a document group having attributes that correspond to a search condition. The apparatus includes an updating unit configured to update the attributes of the document group in accordance with an operation performed by a user on a document in the document group, and a search unit configured to search for a document group having attributes that correspond to user information inputted from the exterior.

11 Claims, 20 Drawing Sheets

FIG. 6

<USER PROPERTY LIST>

| NAME | DEPARTMENT | PROJECT | TASK | ...... |
|---|---|---|---|---|
| USER A | DESIGN 1 | DOCUMENT MANAGEMENT | INSTALLER | ...... |
| USER B | DESIGN 1 | DOCUMENT MANAGEMENT | SPECIFICATIONS | ...... |
| USER C | DESIGN 2 | DOCUMENT MANAGEMENT | INSTALLER | ...... |
| USER D | DESIGN 3 | PrintDriver | SPECIFICATIONS | ...... |
| USER E | DESIGN 2 | DOCUMENT MANAGEMENT | SPECIFICATIONS | ...... |
| USER F | DESIGN 2 | DOCUMENT MANAGEMENT | INSTALLER | ...... |
| USER G | DESIGN 2 | PrintDriver | SPECIFICATIONS | ...... |

FIG. 11B

DOCUMENT GROUP INFORMATION

CLASSIFICATION
- DESIGN 1
- DOCUMENT DISTRIBUTION
- NEW OS COMPLIANCE

DOCUMENT GROUP LIST

SELECTED PROPERTY : DESIGN 1

| DOCUMENT GROUP NAME | OUTLINE | RELATED ITEMS |
|---|---|---|
| DOCUMENT GROUP 1 | DESIGN 1 INFORMATION SHARING DOCUMENT GROUP | - |
| DOCUMENT GROUP 2 | DESIGN 1 CONFERENCE | - |
| DOCUMENT GROUP 4 | OFFICE HOURS MANAGEMENT | - |
| DOCUMENT GROUP 6 | - | - |
| DOCUMENT GROUP 8 | - | - |

REGISTERED DOCUMENTS

DOCUMENT GROUP 1
Doc 1  Doc 2  Doc 3  Doc 4

DOC 1 INDEX INFORMATION

| CATEGORY | INDEX |
|---|---|
| DEPARTMENT | DESIGN 1 |
| PROJECT | DOCUMENT MANAGEMENT |
| MANAGED TASK | INSTALLER |

DOC 2 INDEX INFORMATION

| CATEGORY | INDEX |
|---|---|
| DEPARTMENT | DESIGN 1 |
| PROJECT | DOCUMENT MANAGEMENT |
| MANAGED TASK | SPECIFICATIONS |

DOC 3 INDEX INFORMATION

| CATEGORY | INDEX |
|---|---|
| DEPARTMENT | DESIGN 2 |
| PROJECT | DOCUMENT MANAGEMENT |
| MANAGED TASK | INSTALLER |

DOC 1 INDEX INFORMATION

| CATEGORY | INDEX |
|---|---|
| DEPARTMENT | DESIGN 3 |
| PROJECT | PrintDriver |
| MANAGED TASK | SPECIFICATIONS |

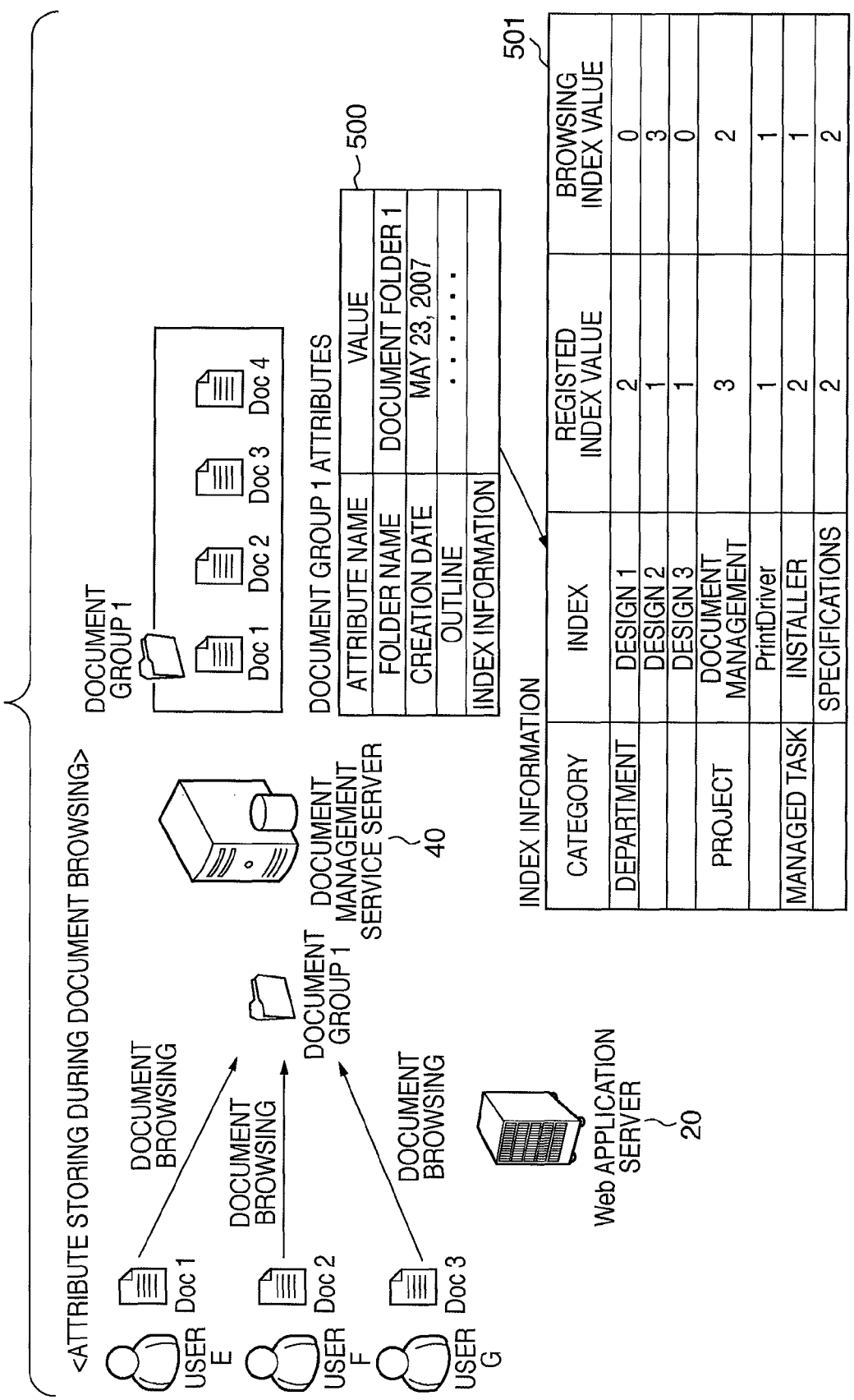

FIG. 15

DOCUMENT GROUP INFORMATION — 601

DOCUMENT GROUP LIST

SELECTED PROPERTY : DESIGN 1

| DOCUMENT GROUP NAME | OUTLINE | RELATED ITEMS |
|---|---|---|
| DOCUMENT GROUP 1 | DESIGN 1 INFORMATION SHARING DOCUMENT GROUP | DOCUMENT MANAGEMENT |
| DOCUMENT GROUP 2 | DESIGN 1 CONFERENCE | DOCUMENT MANAGEMENT |
| DOCUMENT GROUP 4 | OFFICE HOURS MANAGEMENT | — |
| DOCUMENT GROUP 6 | — | — |
| DOCUMENT GROUP 8 | — | — |

NARROWED DOWN BY BROWSER

| DOCUMENT GROUP NAME | OUTLINE | RELATED ITEMS |
|---|---|---|
| DOCUMENT GROUP 9 | — | — |
| DOCUMENT GROUP 10 | — | — |
| DOCUMENT GROUP 11 | — | — |

604

CLASSIFICATION
- DESIGN 1
- DOCUMENT MANAGEMENT
- INSTALLER

REGISTERED DOCUMENTS

DOCUMENT GROUP 1
Doc 1   Doc 2   Doc 3   Doc 4

<DOCUMENT GROUP PRESENTATION WHEN DOCUMENT REGISTERED USING DOCUMENT GROUP ATTRIBUTES>

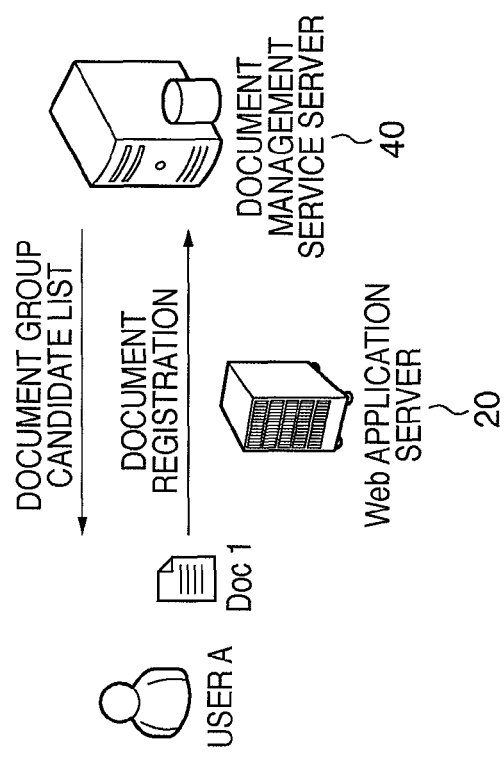

DOCUMENT REGISTRATION DESTINATION
DOCUMENT GROUP CANDIDATE LIST

| | DOCUMENT GROUP NAME | OUTLINE | REGISTERED DOCUMENT LIST |
|---|---|---|---|
| 1 | DOCUMENT GROUP 1 | DESIGN 1 | doc2 |
| 2 | DOCUMENT GROUP 2 | DESIGN 1 | doc3, doc6, xls3 |
| 3 | DOCUMENT GROUP 3 | DOCUMENT MANAGEMENT | doc4, doc7, xls5 |
| 4 | DOCUMENT GROUP 4 | DOCUMENT MANAGEMENT | doc5, doc8, xls7 |
| 5 | DOCUMENT GROUP 5 | INSTALLER | xls1, xls6 |

DOCUMENT MANAGEMENT APPARATUS, METHOD, SYSTEM, MEDIUM STORING A PROGRAM THEREOF

BACKGROUND OF THE INVENTION

1. Field of the Invention

The present invention relates to a document management apparatus that search a document group, a system, method and a medium storing a program thereof.

2. Description of the Related Art

Current document management systems often create a document group using a single folder or category, and save multiple documents within that document group. In this case, "document" refers to, for example, conference materials, reports, or the like. Accordingly, document groups are given labels such as "conference materials", "reports", and so on, and documents related thereto are registered together.

However, with such a document group, predetermined attributes, such as the name of the document group, are simply registered, and thus detailed attribute settings cannot be carried out for the individual registered documents. As a result, a user cannot efficiently search a document group while taking into consideration the documents registered in that document group. There is thus a heavy burden on a user who wishes to search multiple document groups for a certain related document group.

In order to solve this problem, Japanese Patent Laid-Open No. 2000-10996 describes a system that predefines the relationships of keywords and extracts keywords with a high rate of appearance from a document. According to this system, multiple documents are classified based on the extracted keywords, and the keywords are set for the classified folders as indexes, which can then be used in searches. Meanwhile, Japanese Patent Laid-Open No. 2006-72705 describes a system in which keywords with a high rate of appearance in a document registered in a folder are set in the attributes of the folder as specialty keywords. According to this system, it is possible, when performing a search, to automatically narrow down the scope of a search for a folder by inputting the specialty keywords along with the search keywords.

Reusing the documents/information saved in a document group can be given as an example of a reason for a document management system to set index information for document groups. This reuse is targeted at not only the user who registered the document data in the document group, but rather for all users of the system. Here, the document group that includes that document data is a document group that bears significant relevance, in terms of a certain task, for other users who are involved in the same particular task, that belong to the same organization, and have user characteristics similar to the original registrant; it is thus desirable to encourage reuse.

Regarding the classification in Japanese Patent Laid-Open No. 2000-10996, the classification results do not change from user to user. Instead, a user must input search keywords as per the conventional art when s/he wishes to search for documents related to him/herself. Therefore, a user cannot perform an efficient search unless s/he knows what sort of attributes are set. Meanwhile, regarding Japanese Patent Laid-Open No. 2006-72705, it is possible to set a specialty keyword such as "personnel" as the keyword. That specialty keyword may then be updated or new specialty keywords added to the folder based on keywords with a high rate of appearance in the documents included in the folder. However, if specialty keywords are set based on keywords included in documents created by other users, there is no guarantee that keywords consistent among the multiple users will be included in the documents. There is therefore the possibility that specialty keywords using differing notations or that may not be conceivable to other users are set. For this reason, a user cannot find the folder s/he desires unless s/he knows what sort of specialty keywords are set for a folder when inputting a specialty keyword.

SUMMARY OF THE INVENTION

The present invention provides a document management apparatus that can easily search a document group that is optimal for a user.

The present invention in its first aspect provides a document management apparatus that searches at least one document group saved in advance for a document group having attributes that correspond to a search condition, the apparatus comprising: an updating unit configured to update the attributes of the document group in accordance with an operation performed by a user on a document in the document group; and a search unit configured to search for a document group having attributes that correspond to user information inputted from the exterior.

The present invention in its second aspect provides a document management method for a document management apparatus that searches at least one document group saved in advance for a document group having attributes that correspond to a search condition, the method comprising the steps of: updating the attributes of the document group in accordance with an operation performed by a user on a document in the document group; and searching for a document group having attributes that correspond to user information inputted from the exterior.

The present invention in its third aspect provides a computer-readable storage medium on which is stored a document management program for searching at least one document group saved in advance for a document group having attributes that correspond to a search condition, the program causing a computer to function as: an updating unit configured to update the attributes of the document group in accordance with an operation performed by a user on a document in the document group; and a search unit configured to search for a document group having attributes that correspond to user information inputted from the exterior.

The present invention in its fourth aspect provides a document management system that searches at least one document group saved in advance for a document group having attributes that correspond to a search condition, the system comprising: a display unit configured to display a document group having attributes that correspond to user information of a user that uses the document management system; and an updating configured to update the attributes of the document group displayed by the display unit, in accordance with an operation having been performed by a user on a document.

According to the present invention, it is possible to easily search a document group that is optimal for a user.

Further features of the present invention will become apparent from the following description of exemplary embodiments with reference to the attached drawings.

BRIEF DESCRIPTION OF THE DRAWINGS

FIG. 6 is a diagram illustrating an example of a user properties table saved in a user information storage unit.

FIG. 11A is a diagram illustrating an example of a user interface that displays the results of a document group automatic collection process after a user logs in.

FIG. 11B is another diagram illustrating an example of a user interface that displays the results of a document group automatic collection process after a user logs in.

FIG. 12 is a diagram illustrating an outline of a document group index process according to a second embodiment.

FIG. 15 is a diagram illustrating an example of an interface that displays the results of a document group automatic collection process according to the second embodiment.

FIG. 16 is a diagram illustrating an outline of a document group candidate list display process according to a third embodiment.

DESCRIPTION OF THE EMBODIMENTS

Figure 1:
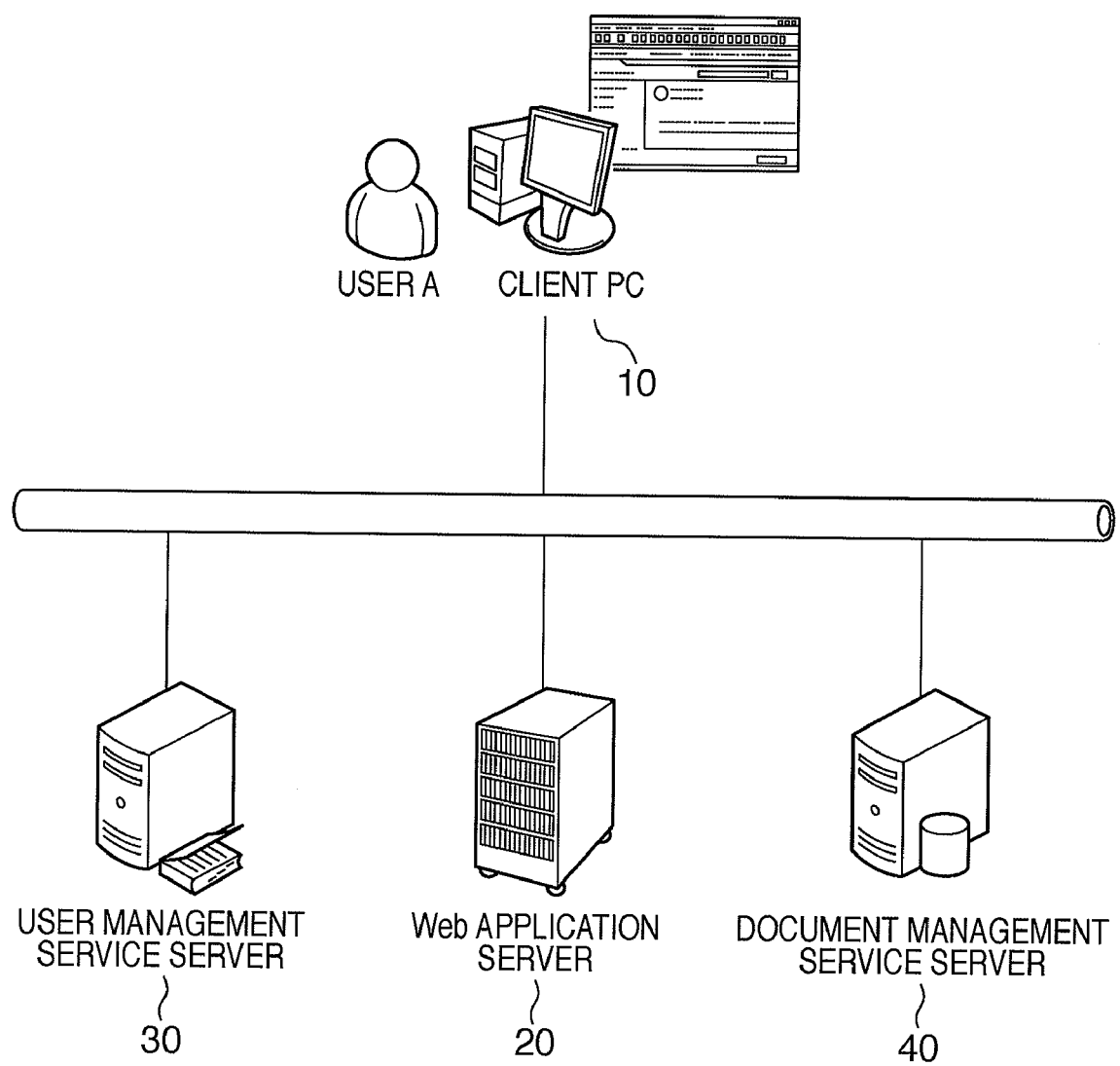
FIG. 1 is a diagram illustrating an outline of a document management system according to an embodiment of the present invention.

Hereinafter, embodiments of the present invention shall be described in detail with reference to the drawings. Note that identical constituent elements shall be given identical reference numerals, and descriptions thereof shall be omitted.

First Embodiment

A first embodiment of the present invention shall be described with reference to FIGS. 1 through 11B.

(System Configuration)

FIG. 1 is a diagram illustrating an outline of a document management system according to an embodiment of the present invention. In the present embodiment, a document management application for, for example, providing the functionality of the document management system to a user, is provided as a web service (a web application). It is assumed that a user A accesses the document management system of the present embodiment via a browser. The web application of the document management system according to the present embodiment is provided through a client PC 10. As shown in FIG. 1, the document management system includes a web application server 20, a user management service server 30, and a document management service server 40. Here, the user management service server 30 manages information of the users that access the system. The document management service server 40 saves and manages documents, document groups, and so on. In the present embodiment, the web application server 20, user management service server 30, and document management service server 40 may be configured using a single PC. Furthermore, the client PC 10 may be configured of the same PC as some or all of the abovementioned three servers. In addition, although the configuration is described as being one in which the user A accesses the web application server 20 via a browser, a dedicated client application (not shown) may instead be installed in the client PC 10, and the user A may then access the server by operating that application. In such a case, the dedicated client application communicates not with the web application server 20 but with the document management service server 40 instead.

(Hardware Configuration)

Figure 2:
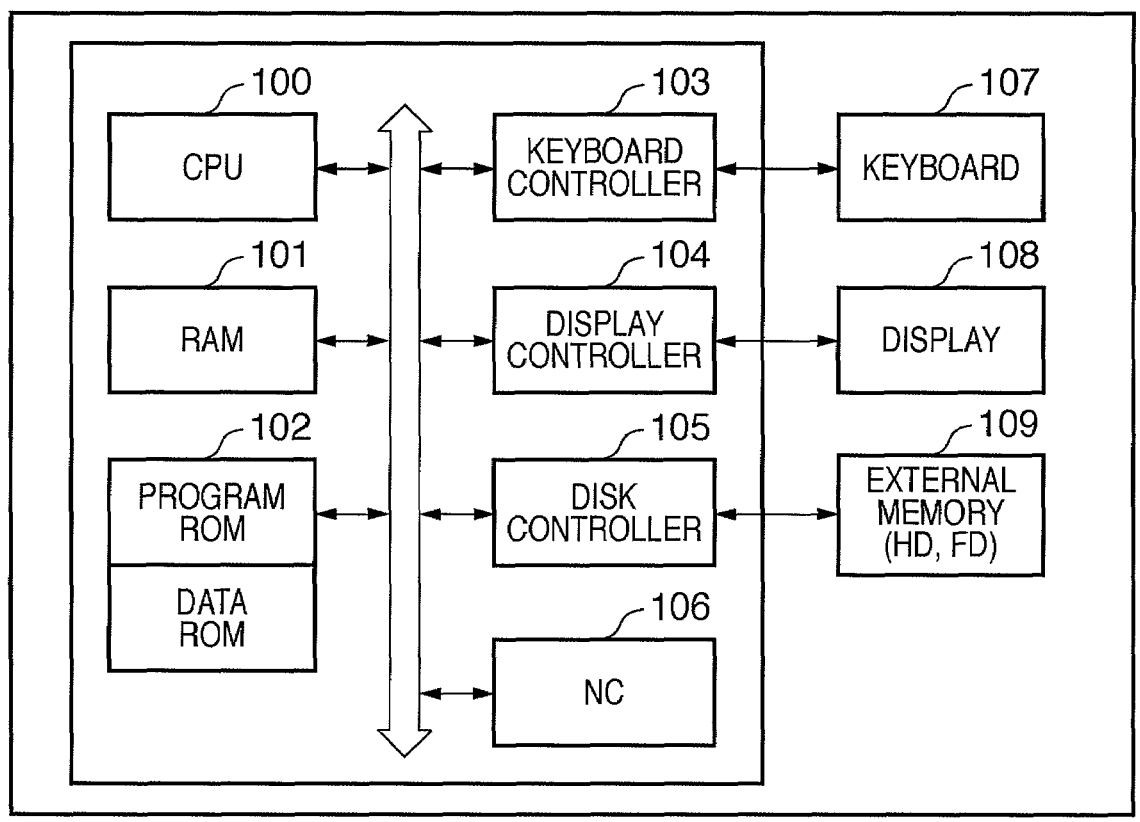
FIG. 2 is a diagram illustrating the hardware configurations of PCs of which a document management system is configured.

FIG. 2 is a diagram illustrating the hardware configurations of PCs of which the document management system of the present embodiment is configured. The hardware configuration shown in FIG. 2 is equivalent to the hardware configuration of a general information processing apparatus. In FIG. 2, a CPU 100 executes programs, such as an OS or applications, that are stored in a program ROM within a ROM 102 or loaded into a RAM 101 from an external memory 109 such as a hard disk. Here, "OS" is an acronym for "operating system", which runs on a computer, and the operating system shall be referred to as an "OS" hereinafter. The processes of the flowcharts mentioned later are implemented by executing this program. The RAM 101 functions as the main memory, a working area, and so on for the CPU 100. A keyboard controller 103 controls key inputs from a keyboard 107, a pointing device (not shown), or the like. A display controller 104 controls the various displays made by a display 108. A disk controller 105 controls the data access to the external memory 109, which is a hard disk (HD), Floppy® disk (FD), or the like in which various types of data are stored. An NC 106 is connected to a network and executes processes for controlling communication with other devices connected to the network.

(Software Configuration)

Figure 3:
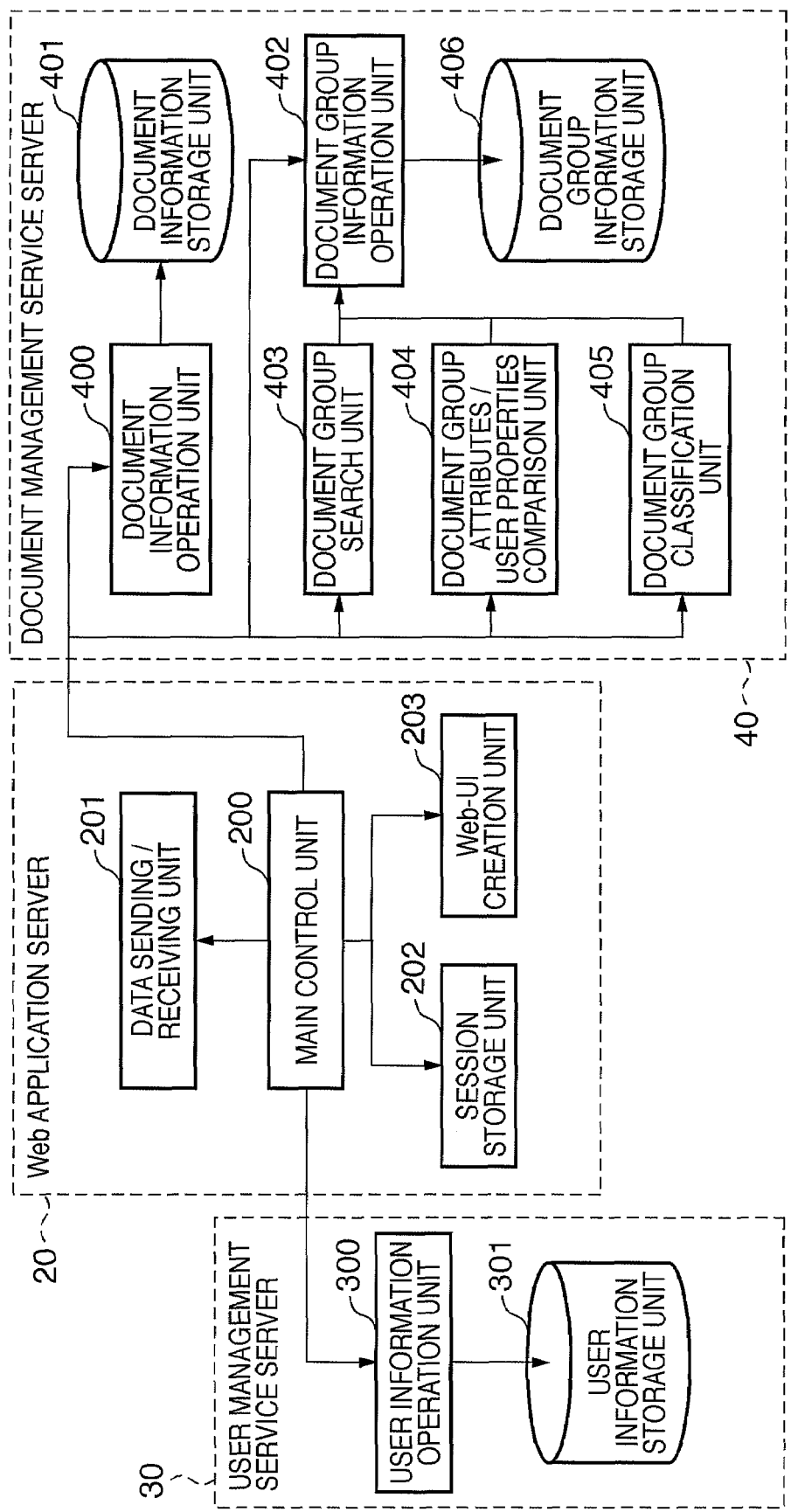
FIG. 3 is a diagram illustrating a software configuration indicating an example of a document management system.

FIG. 3 is a diagram illustrating the software configuration indicating an example of the document management system according to the present embodiment. FIG. 3 also illustrates the peripheral software configuration of the web application server 20. A main control unit 200 controls the overall document management system of the present embodiment, and instructs and manages the various units described hereinafter. A data sending/receiving unit 201 receives commands specified by the user A via the browser of the client PC 10, and returns responses made by the main control unit 200 in response thereto to the client PC 10. When the user A accesses the document management system via the browser of the client PC 10, a session storage unit 202 generates session information in order to indicate that the access is being performed by the same user. Furthermore, the session storage unit 202 can save various types of information in association with the session information, the information being repeatedly used until the user stops accessing (logs out of) the document management system or the session is terminated due to an automatic timeout or the like. A web UI generation unit 203 receives instructions from the main control unit 200 and generates a web UI (HTML) based on the status thereof. Here, the web UI generated by the web UI generation unit is not limited to HTML only; for example, the UI may include a scripting language such as JavaScript®.

Next, a user information operation unit 300 performs operations such as extracting and editing users capable of accessing the document management system, and the user properties thereof, saved in a user information storage unit 301, in accordance with instructions from the main control unit 200. Here, with regard to user management, the configuration may be such that only the user properties are saved in the user information storage unit 301 by having the user information operation unit 300 operate in conjunction with a known active directory, LDAP, or the like, rather than using the proprietary management of the document management system.

Next, a document information operation unit 400 performs operations such as registering, saving, extracting, editing, and so on of documents themselves and document attributes saved in a document information storage unit 401, in accordance with instructions from the main control unit 200. A document group information operation unit 402 performs operations such as registering, saving, extracting, editing, and so on of document groups themselves and document group attributes saved in a document group information storage unit 406, in accordance with instructions from the main control unit 200. The "document group" mentioned in the present embodiment refers to a group, such as those listed below, that includes document data:

(1) a folder that includes at least one piece of document data;
(2) a folder that includes at least one folder;
(3) a file server, including document data and folders, that can be shared across the entire network;
(4) a database or cabinet of the document management system; and
(5) a category associated by keywords set and used when making a post to a blog or the like.

Any form may be used as long as it is a group that includes document data as described above. A document group search unit 403 determines the method to use for searching the documents (search conditions) and obtains document search results from the document information storage unit 401 via the document information operation unit 400, in accordance with instructions from the main control unit 200. A document group attributes/user properties comparison unit 404 compares document group attributes with user properties, in accordance with instructions from the main control unit 200. The document group attributes/user properties comparison unit 404 also adds/updates/deletes document group attributes saved in the document group information storage unit 406 as necessary, via the document group information operation unit 402. A document group classification unit 405 classifies document groups based on index values of index information within the document group attributes in accordance with instructions from the main control unit 200, and returns the results of the classification to the main control unit 200. In the present embodiment, the index values are assumed to be weighting applied to multiple pieces of index information.

Hereinafter, processing performed by the document management system of the first embodiment shall be described with reference to FIGS. 1 through 11B.

Figure 4:
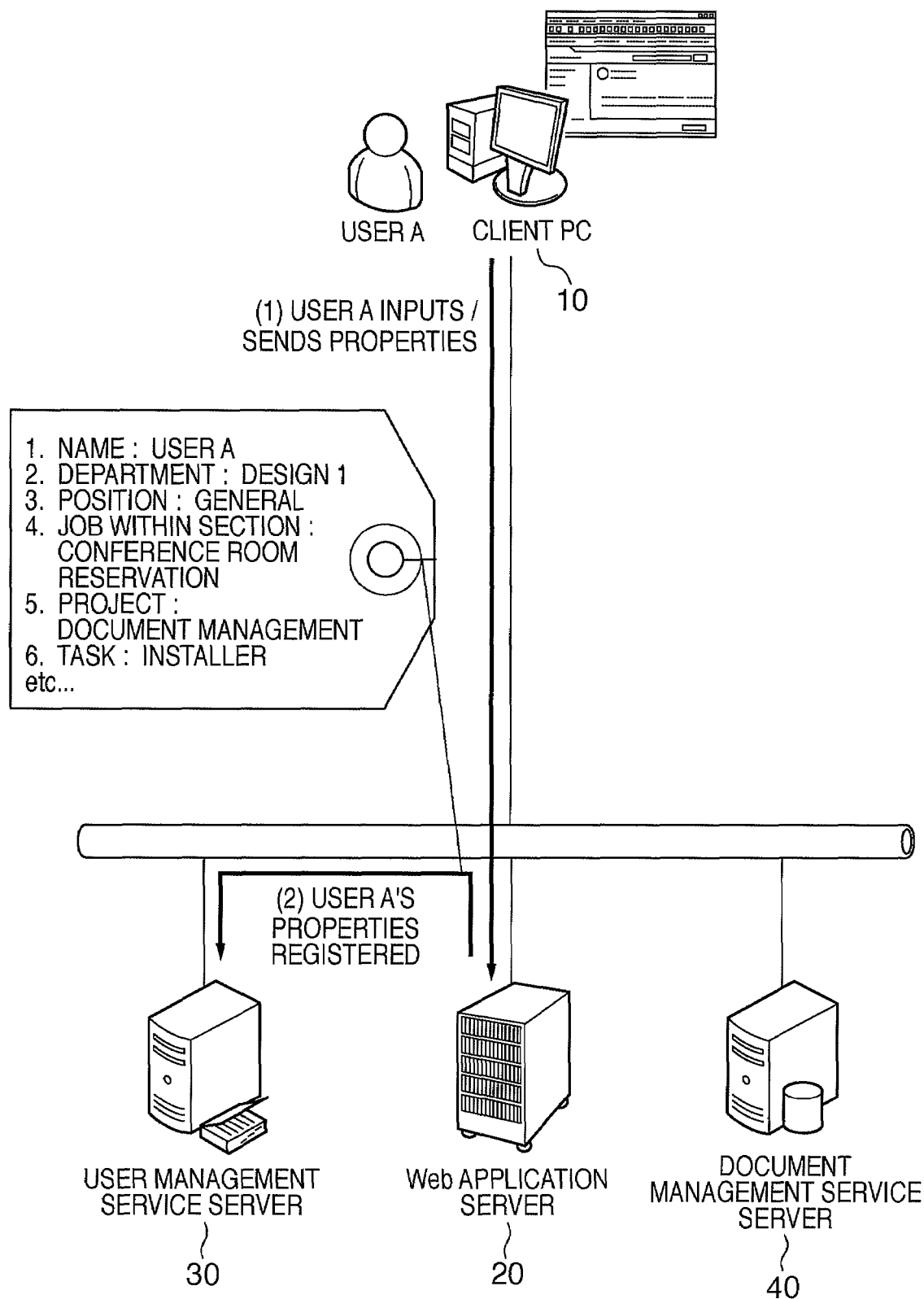
FIG. 4 is a diagram illustrating an outline of a process for logging in and registering user properties.
Figure 5:
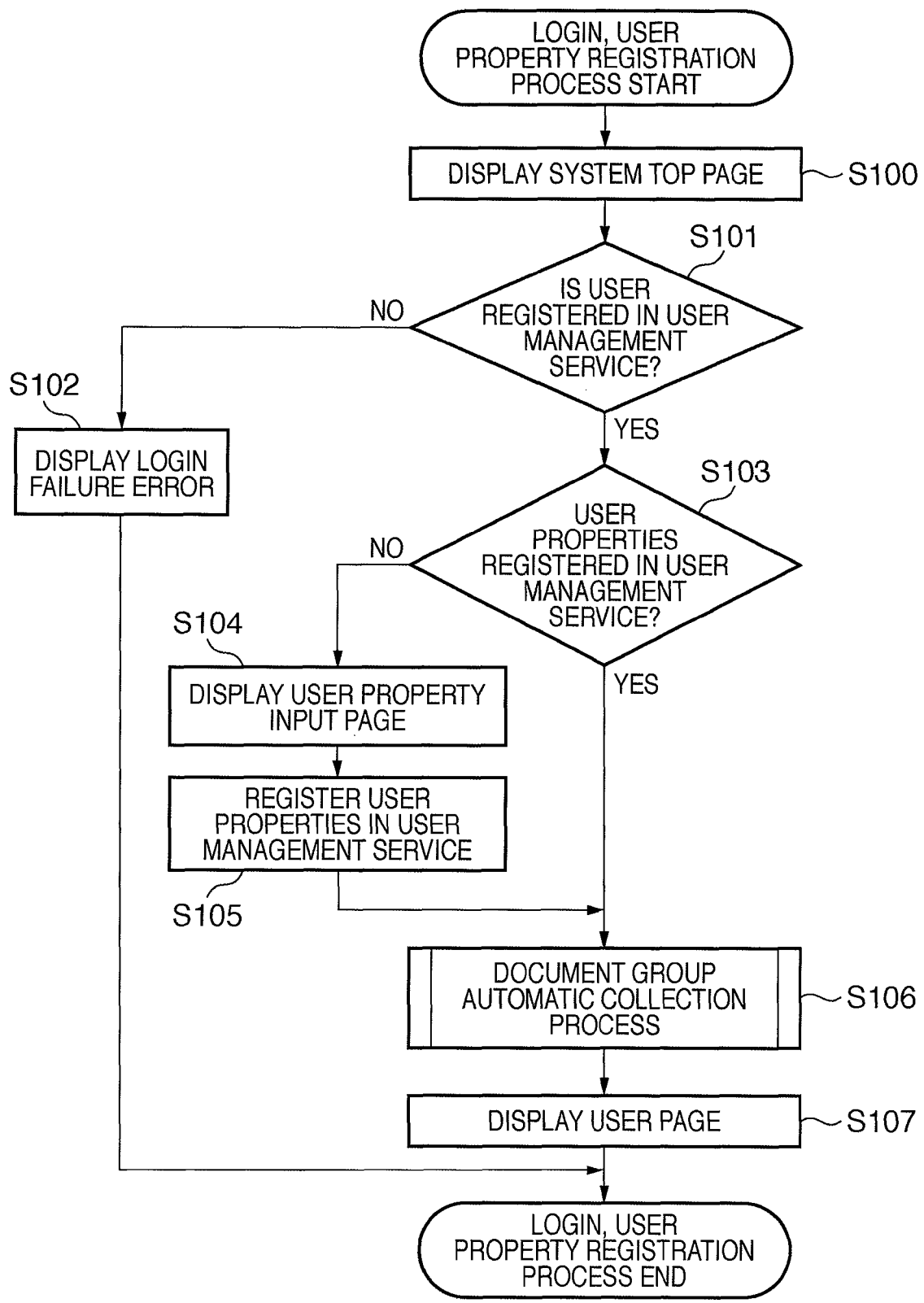
FIG. 5 is a flowchart illustrating a process for logging in and registering user properties.

(Login and User Properties Registration Process) The user A accesses (logs into) the document management system via the browser of the client PC 10, and, when logging in for the first time, enters his/her user properties. The user properties that have been entered are saved in the system on a user-by-user basis. FIG. 4 is a diagram illustrating an outline of a process for logging in and registering user properties using this document management system. Meanwhile, FIG. 5 is a flowchart illustrating a process performed by this document management system when logging in and registering user properties. The following descriptions shall refer to FIGS. 4 and 5. First, in step S100, the user A accesses the top page of the document management system via the browser of the client PC 10. Upon doing so, the main control unit 200, which has received the request via the data sending/receiving unit 201, instructs the web UI generation unit 203 to generate the top page. Next, the generated top page is returned as a response to the client PC 10 via the data sending/receiving unit 201, and is displayed in the browser of the client PC 10. Next, in step S101, the user A enters his/her login information in the top page displayed in step S100. Upon doing so, the main control unit 200, which has received the login information of the user A via the data sending/receiving unit 201, inquires with the user information operation unit 300, and confirms whether or not the user A is registered in the user information storage unit 301. In the case where the result of the confirmation shows that the user A does not exist in the user information storage unit 301 or his/her password is incorrect, in step S102, the main control unit 200 instructs the web UI generation unit 203 to generate an error page indicating that the login has failed. The error page is then returned as a response to the client PC 10 via the data sending/receiving unit 201, and is displayed in the browser of the client PC 10.

Next, in the case where the result of step S101 indicates that the user A does exist in the user information storage unit 301, in step S103, the main control unit 200 instructs the session storage unit 202 to generate session information. Then, the main control unit 200 inquires with the user information storage unit 301 and confirms whether or not the user properties of the user A are registered in the user information storage unit 301. Note that there is no particular limit with regards to the timing at which the session information is generated. In the case where the result of step S103 indicates that the user properties of the user A are not registered, in step S104, the main control unit 200 instructs the web UI generation unit 203 to generate a user properties input page. The user properties input page is then returned as a response to the client PC 10 via the data sending/receiving unit 201, and is displayed in the browser of the client PC 10. Then, in step S105, the user A enters his/her user properties through the user properties input page displayed in step S104, after which the main control unit 200 receives the user properties of the user A via the data sending/receiving unit 201. Next, the main control unit 200 instructs the user information operation unit 300 to register the user properties of the user A in the user information storage unit 301. In this case, the main control unit 200 also instructs the session storage unit 202 to save the user properties along with the generated session information. The result is that the user properties of the user A need not be obtained from the user information storage unit 301 every time, thus making it possible to improve the speed of the processing.

A user properties table shall be described next. FIG. 6 is a diagram illustrating an example of a user properties table saved in the user information storage unit 301. As illustrated in FIG. 6, items such as the user's department, position, job within his/her section, project, task within the project, and so on are included as user properties; these properties are used to assign attributes to document groups, and are used in the automatic document group collection process, which shall be mentioned later. Note that other information, aside from that shown in FIG. 6, may also be included as user properties. Furthermore, multiple values may be included in the user property items. For example, it is desirable for multiple items to be selectable in the case where a user is involved in multiple projects. It is furthermore desirable for the user properties input page to be in a format in which the user selects user property items rather than allowing the user to freely enter those items. In such a case, an administrator or the like of the installation site sets appropriate selection items in advance, in accordance with the user environment in which the document management system is installed.

Figure 11A:
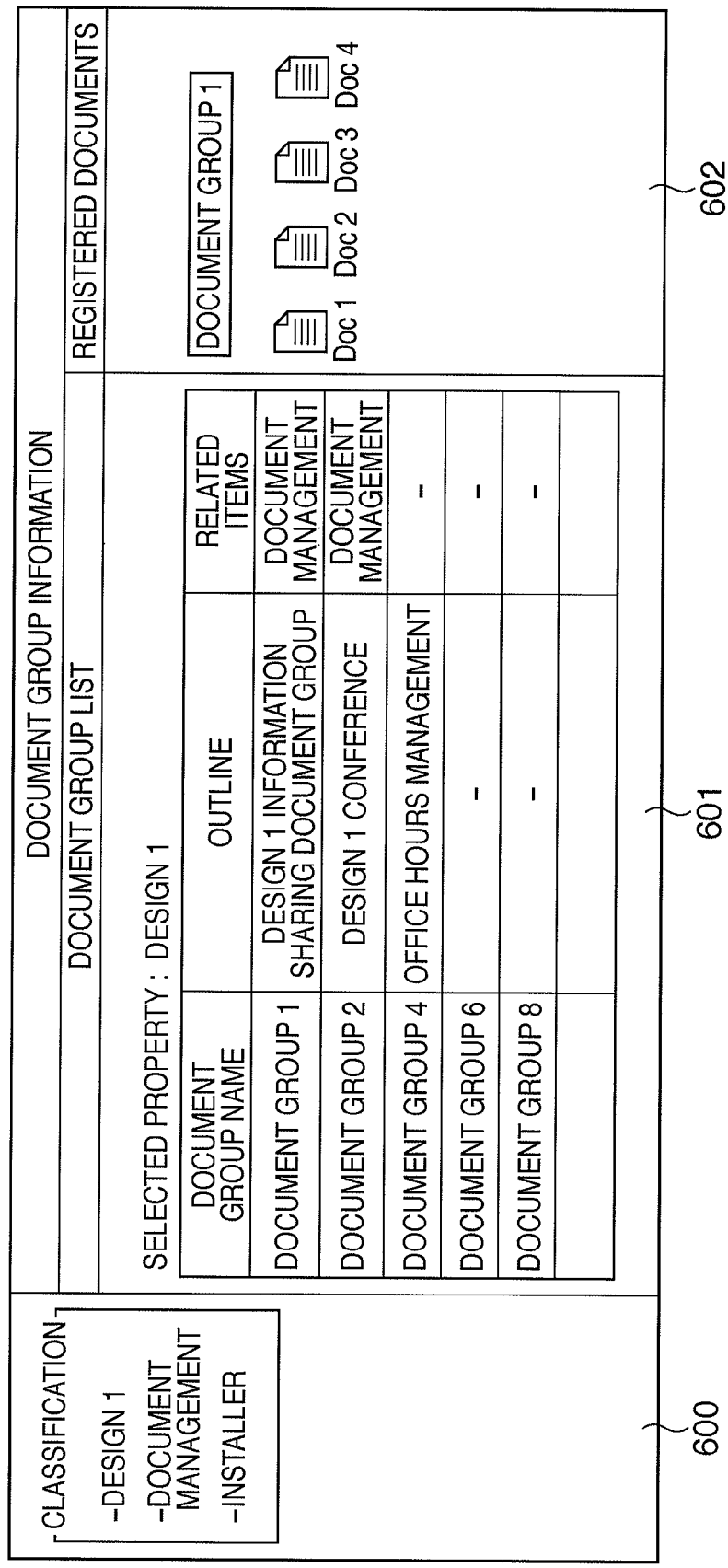

Referring once again to FIG. 5, in step S106, a document group automatic collection process is executed based on the user properties of the user A. The processing of step S106 shall be described later. Then, in step S107, the main control unit 200 instructs the web UI generation unit 203 to generate the user A's page in accordance with displayed content that has been collected and classified in step S106 based on the user properties of the user A. The main control unit 200 then returns the user A's page as a response to the client PC 10 via the data sending/receiving unit 201, after which that page is displayed in the browser of the client PC 10. Although it shall be described in detail in the descriptions of the document group automatic collection process, it should be noted that FIGS. 11A and 11B illustrate examples of the user A's page, in which the document groups that have been collected and classified based on the user properties are displayed in an identifiable manner.

(Process for Registering Document in Document Group)

Figure 7A:
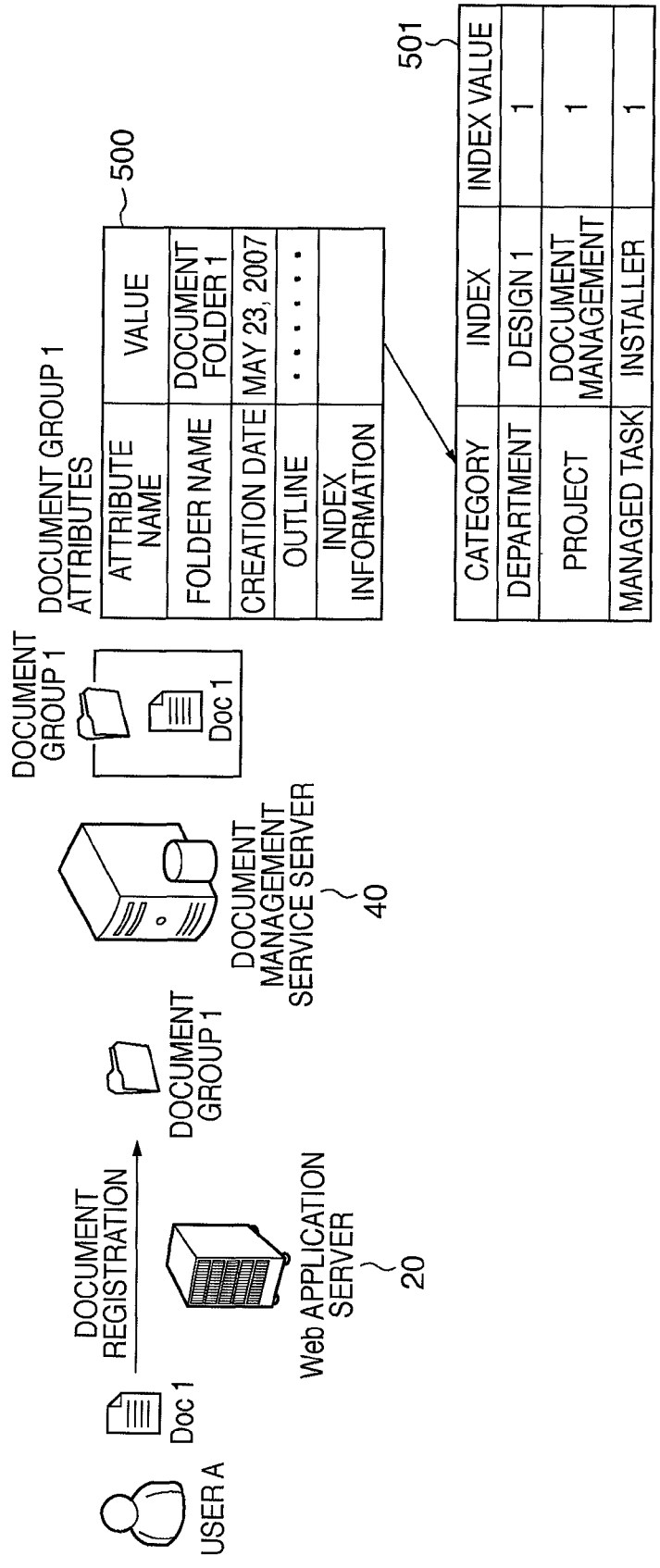
FIG. 7A is a diagram illustrating an outline of a process for registering a document in a document group.
Figure 7B:
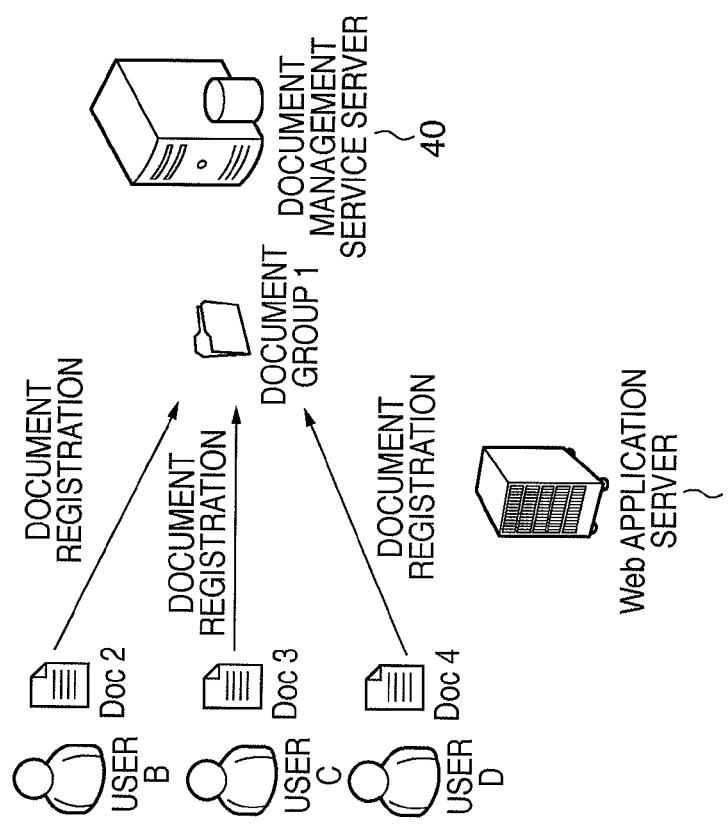
FIG. 7B is another diagram illustrating an outline of a process for registering a document in a document group.
Figure 8:
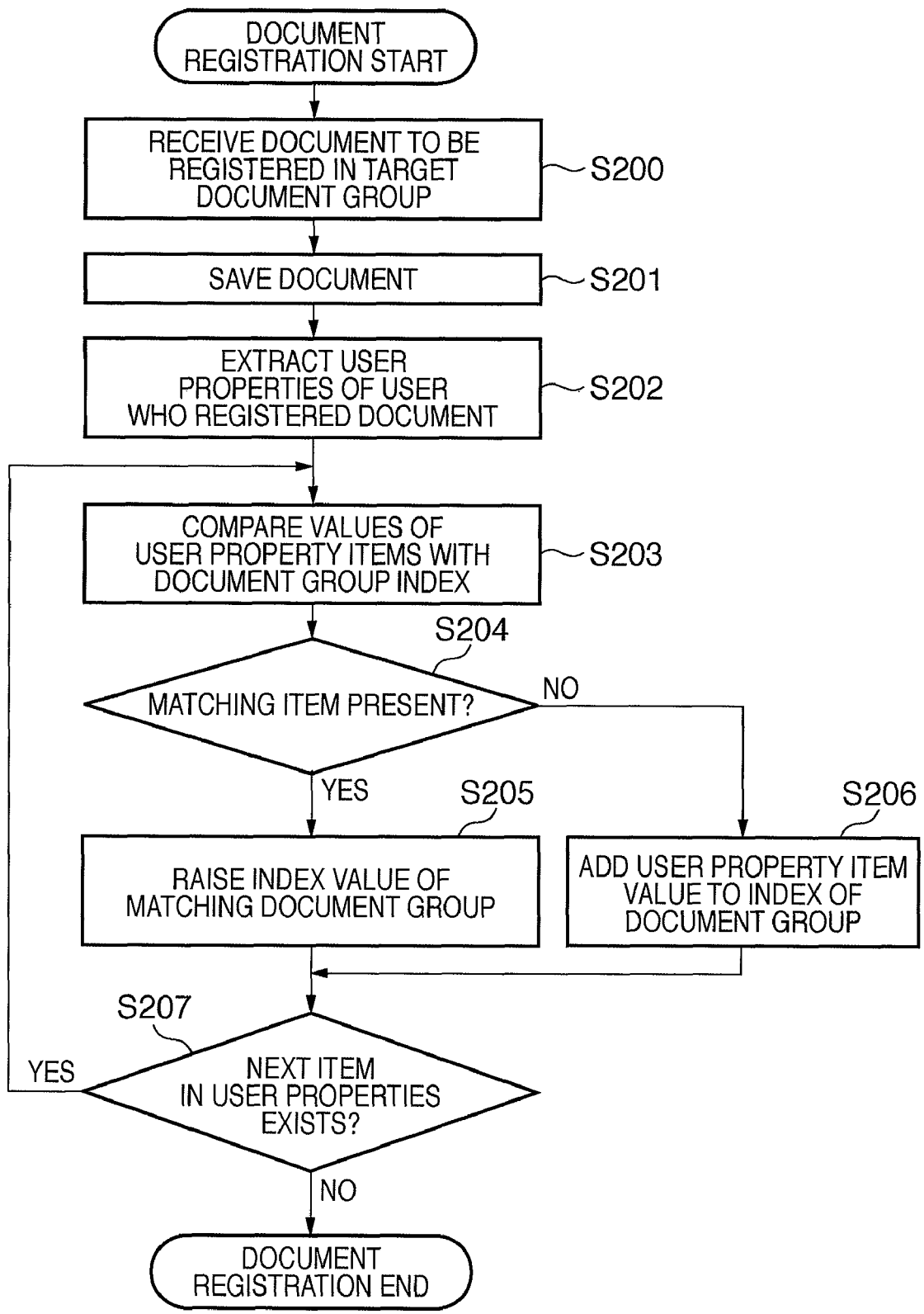
FIG. 8 is a flowchart illustrating a process for registering a document in a document group.

A certain user accesses (logs into) the document management system via the browser of the client PC 10, specifies documents and document groups, and registers those specified documents and groups in the system. FIGS. 7A and 7B are diagrams illustrating an outline of a process for registering documents in a document group using this document management system. FIG. 8, meanwhile, is a flowchart illustrating the process for registering a document in a document group using this document management system when processing documents. Hereinafter, detailed descriptions shall be given with reference to FIGS. 7A, 7B, and 8. In step S200, when a document is registered in a target document group (the document group name being "document group 1"), the main control unit 200 receives the document (the document name being "Doc1") via the data sending/receiving unit 201. Then, the main control unit 200 saves the document in association with session information in the session storage unit 202, for the time being. Next, in step S201, the document Doc1 saved in the session storage unit 202 in step S200 is saved in the document information storage unit 401. After this, in step S202, the main control unit 200 obtains the user properties of the user saved in the session storage unit 202 in step S200. Note that the main control unit 200 may also instruct the user information operation unit 300 to obtain the user properties of the user from the user information storage unit 301.

Next, in step S203, the document group attributes/user properties comparison unit 404 compares the item values of the user properties extracted in step S202 with an index in index information 501 of attributes 500 of the document group in which the document Doc1 was registered. Then, in step S204, it is determined whether or not the results of step S203 indicate that the index of the document group attributes matches the user property item values. In the case where it is determined that the index and values do not match, in step S206, the document group attributes/user properties comparison unit 404 instructs the document group information operation unit 402 to carry out the following operations. First, the document group attributes/user properties comparison unit 404 adds the user property item values to the index in the index information 501 of the document group 1 saved in the document group information storage unit 406. For example, an index "design1" and an index value "1" are added to the category "department" in the index information 501 of the document group 1. In the present embodiment, the results of the comparison made by the document group attributes/user properties comparison unit 404 are added, on an item-by-item basis, to the index in the index information 501 of the document group saved in the document group information storage unit 406. However, the collective results of comparing all items may be applied instead.

Meanwhile, in the case where the document group attributes/user properties comparison unit 404 has, in step S203, determined that the index in the index information 501 of the document group 1 and the user property item values match, the process moves to step S205. This includes, for example, a case where the user registers a document in a document group, and later updates the document included in that document group. In step S205, the document group attributes/user properties comparison unit 404 instructs the document group information operation unit 402 to update the index values in the index of the document group 1 saved in the document group information storage unit 406. For example, the index value of the index "design1" is updated in the category "department" in the index information 501 of the document group 1. In the present embodiment, indexes of the document group attributes saved in the document group information storage unit 406 are added to on an item-by-item basis based on the results of the comparison made by the document group attributes/user properties comparison unit 404. However, the collective results of comparing all items may be applied instead. Then, in step S207, it is confirmed whether or not the next item in user properties exists. For example, "project" exists as the next item in the user properties, and thus the process returns to step S203. The processes of steps S203 to S207 are then repeated, and when the comparisons for all document group indexes has ended for all user property items, the process for registering the document to the document group ends.

FIG. 7A illustrates the results of the addition of the index in the index information 501 of the document group, immediately after the document Doc1 has been registered. Meanwhile, FIG. 7B illustrates the results of changing the index values in the index information 501 of the document group after the user has added documents Doc2, Doc3, and Doc4 to the document group 1. As a result of the change in index values, in the document group, the index value of an index "document management" in the category "project" is higher than the index value of an index "design1" in the category "department" and an index "installer" in a category "managed task". Note that the processes for adding and changing the index of a document group use the user properties of the document registrant in the above-described flowchart. However, document attributes, keywords within documents, the user properties of users set as being related to the document group, and so on may be used instead of the user properties of the document registrant. In the present embodiment, information such as user properties, keywords within documents, and so on, that forms the criteria for updating (including adding to) the index, is referred to as "criteria information".

(Document Group Automatic Collection Process)

Figure 9:
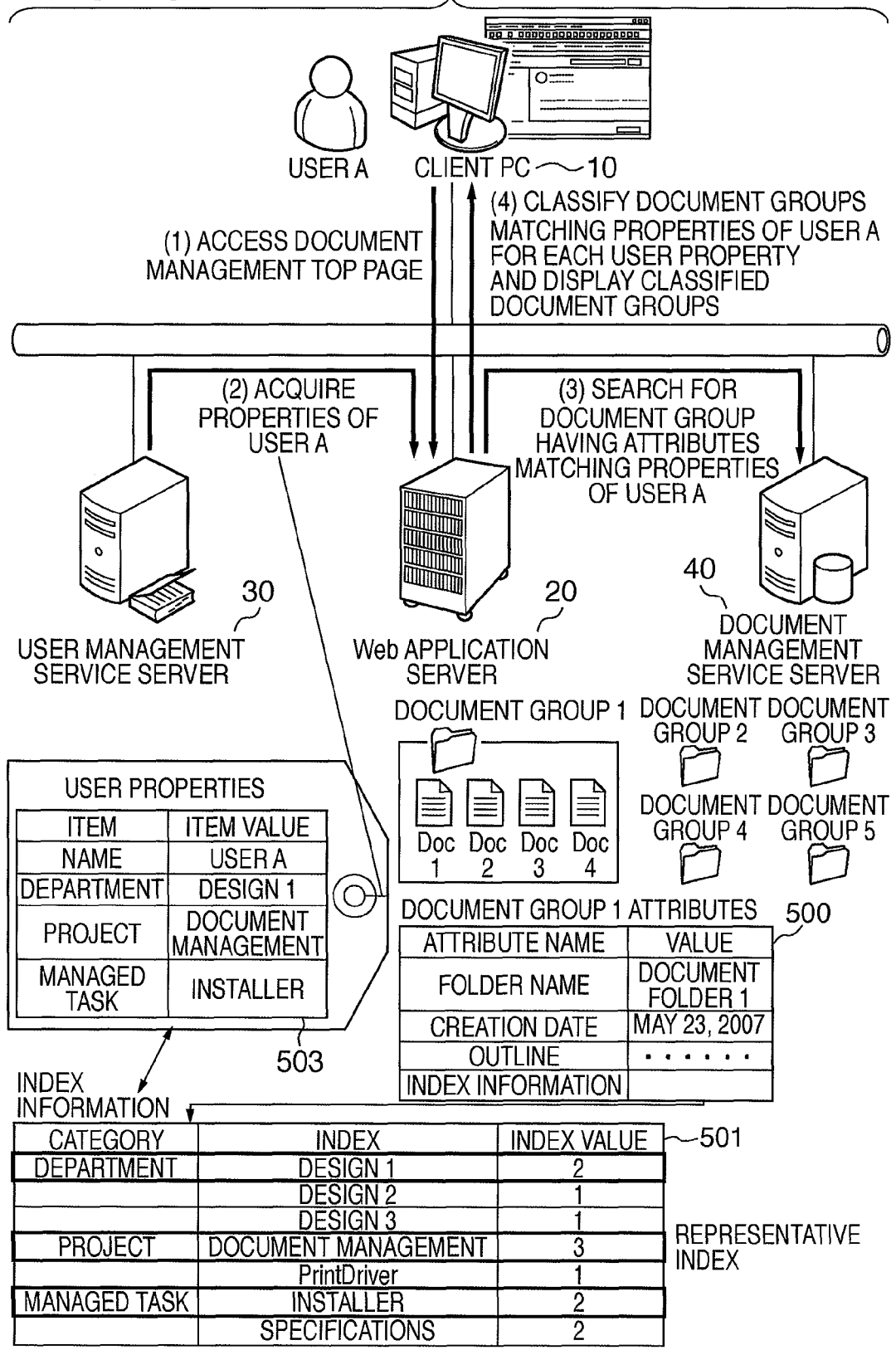
FIG. 9 is a diagram illustrating an outline of a document group automatic collection process performed in an embodiment.
Figure 10:
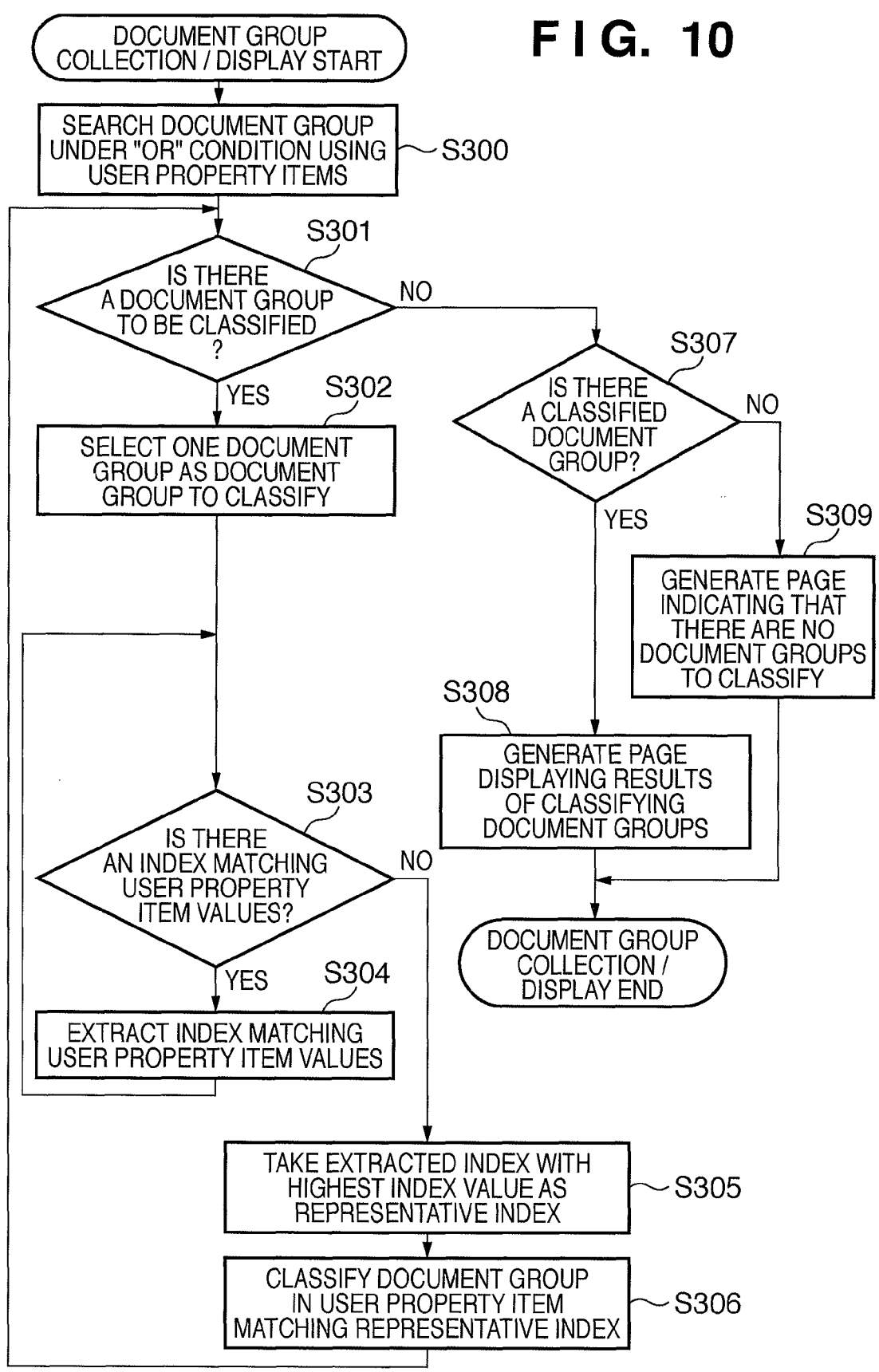
FIG. 10 is a flowchart illustrating a document group automatic collection process.

When the user A accesses (logs into) the document management system via the browser of the client PC 10, a document group collection process is performed automatically, and a document list obtained as a result is displayed in the browser of the client PC 10. Hereinafter, a user who logs in and searches a document group shall specifically be referred to as a "user of interest". FIG. 9 is a diagram illustrating an outline of a document group automatic collection process performed by the document management system. FIG. 10, meanwhile, is a flowchart illustrating the processing performed by the document management system during the document group automatic collection process. The following detailed descriptions shall refer to FIGS. 9 and 10. Note that the flowchart of the document group automatic collection process shown in FIG. 10 illustrates the processing performed after the user A has logged into the document management system and the user properties 503 of the user A have been obtained. In step S300, the document group search unit 403 instructs the document group information operation unit 402 to perform the following operations under "OR" conditions, based on instructions from the main control unit 200, and using the values of the various items in the user properties as keywords. First, the document group search unit 403 searches the document group information storage unit 406 for a document group that matches the conditions. For example, in the case of the user A, the search is performed using the user properties of "design1" for department, "document management" for project, "installer" for managed task, and so on as keywords. Next, in step S301, in the case where the document group search unit 403 has found a document group that matches the conditions set forth in step S300, a single arbitrary document group is, in step S302, selected from the document groups found as a result of the search as a document group to be classified.

After this, in step S303, in the case where an index of index information 501 that matches the values of the user property items is present, that index is extracted into a memory region or the like. In other words, the processes of step S303 and S304 are repeated, and all indexes matching the user property item values are extracted from the document group. Then, in step S305, the index with the highest index value is taken from the indexes extracted in step S304 as a representative index. For example, of the three indexes "design1", "document management", and "installer" shown in FIG. 9, "document management", whose index value is the highest, is taken as the representative index. Next, in step S306, the currently-processed document group is classified into the user property item values that match the representative index extracted in step S305. For example, in FIG. 9, the document group 1 is classified into the item value "document management" of the user property item "project". Steps S301 to S306 are then repeated for all the document groups found in step S301.

Next, in step S307, in the case where a document group that has been classified based on the user property item values is present, the document group classified by the document group classification unit 405 in step S306 is, in step S308, obtained by the main control unit 200. The main control unit 200 then instructs the web UI generation unit 203 to generate a page displaying a list of the document groups automatically collected and classified based on the user properties. The generated page is then returned as a response to the client PC 10 via the data sending/receiving unit 201, and is displayed in the browser of the client PC 10 as a post-login page for each user.

FIG. 11A is a diagram illustrating an example of a user interface that displays the document group collection results after logging into the document management system. Here, for example, a user whose user properties are "design1" for department, "document management" for project, and "installer" for managed task is logged in. The user properties of the user who has logged in are displayed as a selection list in a user property item selection list 600. Document groups are displayed in a document group display area 601 in accordance with items selected from the user property item selection list 600. For example, document groups related to user properties of "design1" for department, "document management" for project, and "installer" for managed task are automatically collected. Meanwhile, in a state where "design1" is selected, the document groups classified into "design1" through the process illustrated in FIG. 10 are displayed in a list in an identifiable manner. In other words, in the present embodiment, when, for example, the user A with a user property of "design1" for department logs in and selects "design1" in the screen shown in FIG. 11A, a list of document groups in which documents registered by users whose properties include "design1" is displayed. To rephrase, the property "design1" is the most numerous in the properties of the users who registered documents in the respective document groups that are displayed.

Meanwhile, related items are displayed for each document group, in the case where other items included in the user property item selection list 600, aside from "design1", serving as an outline or a category of index information for the document group, are registered. The documents registered in the document group selected in the document group display area 601 are displayed in a document display area 602. For example, in the case where the "document group 1" displayed in the document group display area 601 has been selected, the documents "doc1", "doc2", "doc3", and "doc4", which are registered in the "document group 1", are displayed in the document display area 602.

FIG. 11B is an example in which a user whose user properties are "design1" for department, "document distribution" for project, and "new OS compliance" for managed task is logged in. In this example, the user has selected "design1" in the user property item selection list 600 and "document group 1" in the document group display area 601. "Doc1" and "doc2", which have been registered by a user whose user properties has "design1" for department, are included in the "document group 1". Furthermore, documents that have been registered by users who have user properties aside from "design1", or in other words, the document "doc3" registered by a user whose user properties include "design2" and the document "doc4" registered by a user whose user properties include "design3", are also included. Therefore, in the present embodiment, documents of users who do not have the user property of "design1" for department can also be collected, in a simple manner, as documents bearing relation to "doc1" and "doc2".

As described thus far, according to the present embodiment, when a user logs in and selects an arbitrary user property item, document folders with a strong relationship to that item are automatically retrieved and displayed in a list. As a result, it is possible to improve the efficiency with which a user finds a desired document. Furthermore, by collecting documents as a document group provided with an index (weighted), despite the fact that documents are being searched for and collected using user properties, documents with no direct correlation to the properties of the user him/herself can retrieved by taking the relationships between documents themselves into consideration. Note that the format, structure, and controls of the web UI (HTML) depicted as an example of the user interface in FIGS. 11A and 11B are not particularly limited. Any format is acceptable as long as HTML is generated in order to implement the necessary functions.

Second Embodiment

A second embodiment of the present invention shall be described with reference to FIGS. 1 through 10 and 12 through 15. In the second embodiment, the user properties of users that have browsed documents registered in the system are taken into consideration, and the index of the document group in which the browsed documents are registered changes the document groups displayed in accordance with an index of browsing index values and user properties.

(Document Group Index Value Update Process)

Figure 13:
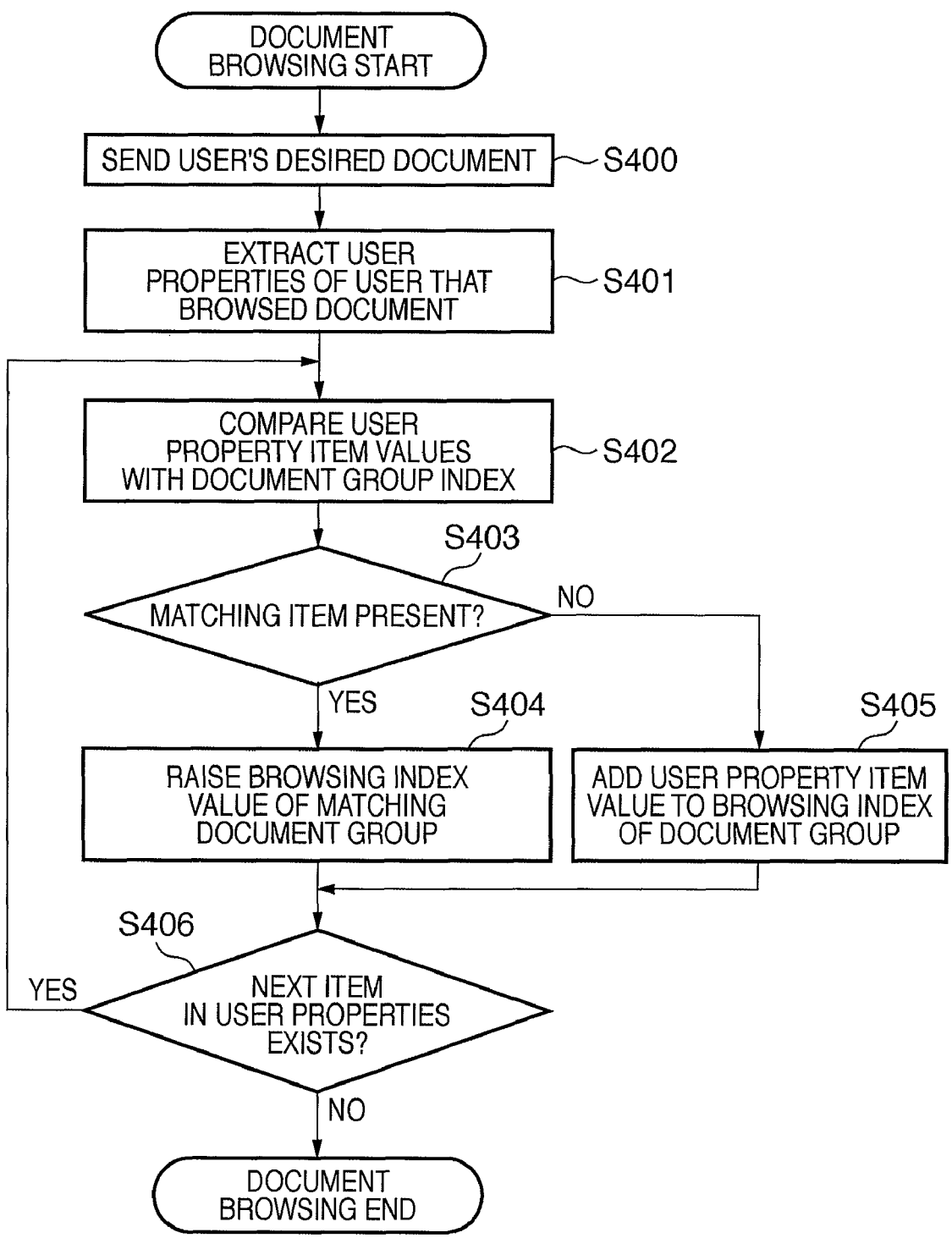
FIG. 13 is a flowchart illustrating a document group index update process according to the second embodiment.

When a certain user accesses (logs into) the document management system via the browser of the client PC 10 and browses a specific document, the document management system automatically updates the index of the document group that includes the browsed document. FIG. 12 is a diagram illustrating an outline of a document group index process performed by the document management system according to the second embodiment. As shown in FIG. 12, in the present embodiment, two types of index values, or a "registration index value" and a "browsing index value", are given to the index. Here, the "registration index value" is the same as the "index value" indicated in FIG. 9. FIG. 13 is a flowchart illustrating a document group index update process performed by the document management system according to the second embodiment. The following descriptions shall refer to FIGS. 12 and 13.

In step S400, when a document included in a target document group (the document group name being "document group 1") is browsed, the main control unit 200 sends the document (the document name being "Doc1") via the data sending/receiving unit 201. Then, the main control unit 200 saves the user properties in association with session information in the session storage unit 202, for the time being. After this, in step S401, the main control unit 200 obtains the user properties of the user saved in the session storage unit 202. Here, the main control unit 200 may also instruct the user information operation unit 300 to obtain the user properties of the user from the user information storage unit 301. Next, in step S402, the item values of the user properties extracted in step S401 are compared with the index of the document group 1 that includes the document Doc1 that was browsed. Then, in step S403, in the case where the document group attributes/user properties comparison unit 404 has, in step S402, determined that the index in the index information 501 of the document group and the user property item values do not match, the process moves to step S405. In step S405, the document group attributes/user properties comparison unit 404 instructs the document group information operation unit 402 to perform the following. First, the document group attributes/user properties comparison unit 404 adds the user property item values to the index in the index information 501 of the document group 1 saved in the document group information storage unit 406, and adds a new browsing index value.

Meanwhile, in step S403, in the case where the document group attributes/user properties comparison unit 404 has determined that the index in the index information 501 of the document group and the user property item values do match, the process moves to step S404. In step S404, the document group attributes/user properties comparison unit 404 instructs the document group information operation unit 402 to update the browsing index values in the index information 501 of the document group 1 saved in the document group information storage unit 406. Here, the results of the comparison made by the document group attributes/user properties comparison unit 404 may be added, on an item-by-item basis, to the index in the index information 501 of the document group saved in the document group information storage unit 406. However, the collective results of comparing all items may be applied instead. Then, in step S406, it is confirmed whether or not the next item in user properties exists. For example, if "project" exists as the next item in the user properties, the process returns to step S402.

When the processing of steps S402 to S406 has been repeated for all user property items, the document group index update process, based on document browsing, ends. FIG. 12 illustrates the results of changing the index in the index information 501 of the document group after the user has browsed documents Doc2, Doc3, and Doc4. As a result of this change, the browsing index value of the index "design2" is the highest.

(Document Group Automatic Collection Process Based on Browsing Index Value)

Figure 14:
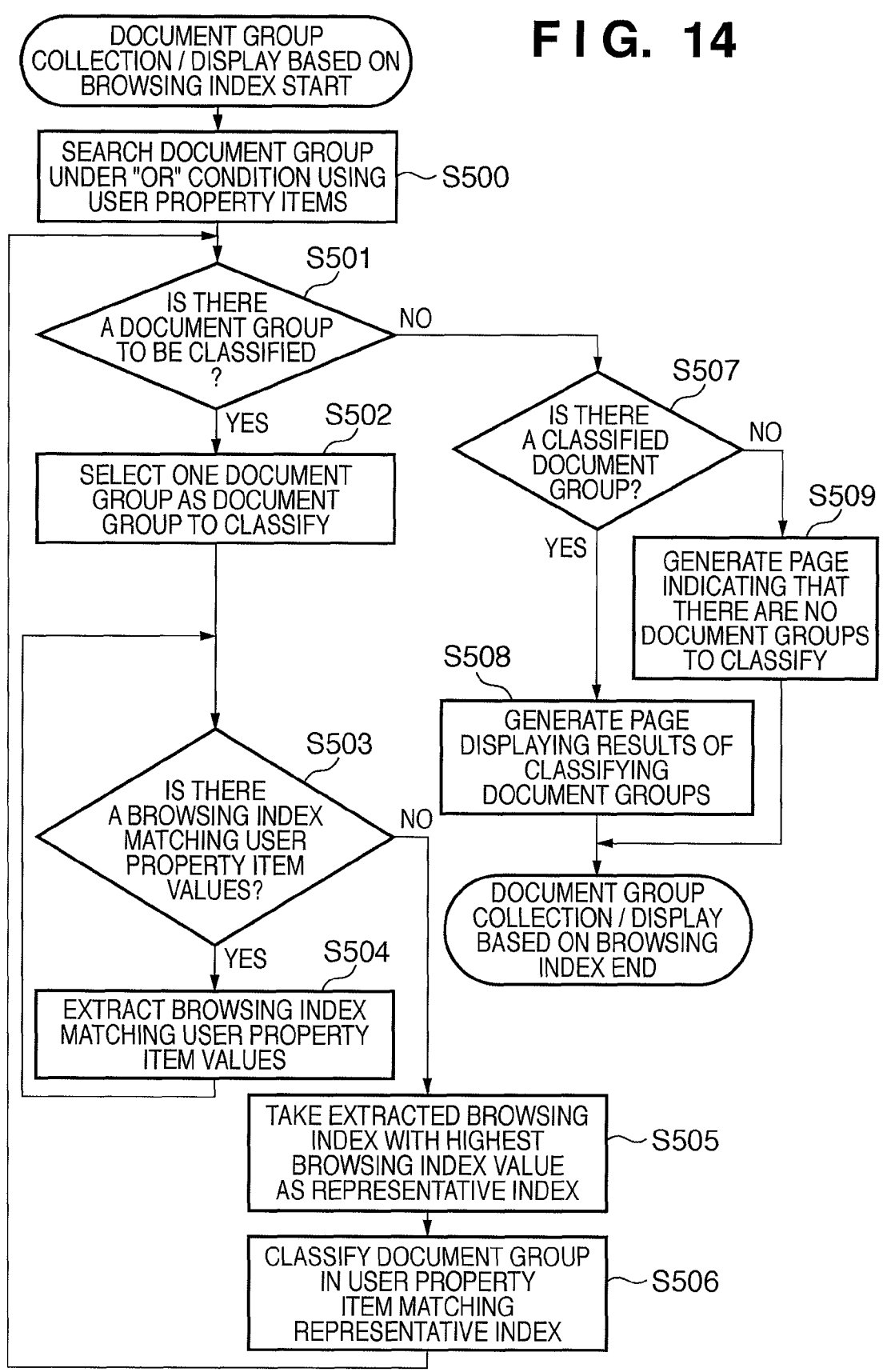
FIG. 14 is a flowchart illustrating a document group automatic collection process according to the second embodiment.

FIG. 14 is a flowchart illustrating a document group collection process performed by the document management system according to the second embodiment. FIG. 15 is a diagram illustrating an example of an interface that displays the results of the document group collection process according to the second embodiment. The following detailed descriptions shall refer to FIGS. 12 through 15. First, in step S500, the main control unit 200 instructs the document group information operation unit 402 to perform the following operations under "OR" conditions using the values of the various items in the user properties as keywords. First, the document group search unit 403 searches the document group information storage unit 406 for a document group that matches the conditions.

Next, in step S501, in the case where the document group search unit 403 has found a document group that matches the conditions set forth in step S500, a single arbitrary document group is, in step S502, selected from the document groups found as a result of the search as a document group to be classified. After this, in step S503, in the case where an index that matches the values of the user property items is present, that index is extracted into a memory region or the like. In other words, the processes of step S503 and S504 are repeated, and all indexes matching the user property item values are extracted from the document group.

Next, in step S505, the index with the highest browsing index value is taken from the indexes extracted in step S504 as a representative index. For example, of the five indexes "design2", "document management", "PrintDriver", "installer", and "specifications" shown in FIG. 12, "design2", whose browsing index value is the highest, is taken as the representative index. In step S506, the document group is classified into the user property item values that match the representative index extracted in step S505. For example, the document group is classified into the item value "design2" in the item "department" of the user properties, which matches with the representative index "design2". Steps S501 to S506 are then repeated for all the document groups found in step S501.

Next, in step S507, in the case where a document group that has been classified based on the user property item values is present, the document group classified by the document group classification unit 405 in step S506 is, in step S508, obtained by the main control unit 200. The main control unit 200 then instructs the web UI generation unit 203 to generate a page displaying a list of the document groups automatically collected based on the user properties and classified using the browsing indexes. The generated page is then returned as a response to the client PC 10 via the data sending/receiving unit 201, and is displayed in the browser of the client PC 10 as a post-login page for each user.

FIG. 15 is an example of a user interface that displays the document group collection results after logging into the document management system. Document groups are displayed in the document group display area 601 in accordance with items selected from the user property item selection list 600. For example, the top portion of the document group list shown in FIG. 15 displays a list of document groups, in which document groups related to user properties of "design1", "document management", and "installer" have been automatically collected and classified into "design1" through the process illustrated in FIG. 10. In the present embodiment, the list of document groups classified into "design1" using the browsing index value of the index information 501 added to the document group attributes as shown in FIG. 12 is displayed separately in the lower portion of FIG. 15 (a browsing index classification display 604).

As described thus far, in the present embodiment, the user can not only collect document groups to which index values have been added based on the user properties of the registrant, but can also automatically collect document groups to which index values have been added in consideration of the user properties of the users who browsed the document group. In the present embodiment, the list display is carried out using only the browsing index value of the document group. However, both the registration index value and the browsing index value may be used. For example, document groups that have not been classified into a user property item using the registration index value may be extracted in the process of FIG. 10, and the process of FIG. 14 may then be carried out. Note that the format, structure, and controls of the web UI (the web user interface written in HTML) depicted as an example of the user interface in FIG. 15 are not particularly limited. Any format is acceptable as long as HTML is generated in order to implement the necessary functions.

Third Embodiment

A third embodiment of the present invention shall be described with reference to FIGS. 1 through 11B and 16. In the third embodiment, when a document is registered in the system, a list of candidates for document groups to serve as a registration destination for the document is displayed, taking into consideration keywords included in the document.

(Registration Destination Document Group Candidate List Display Process)

Figure 17:
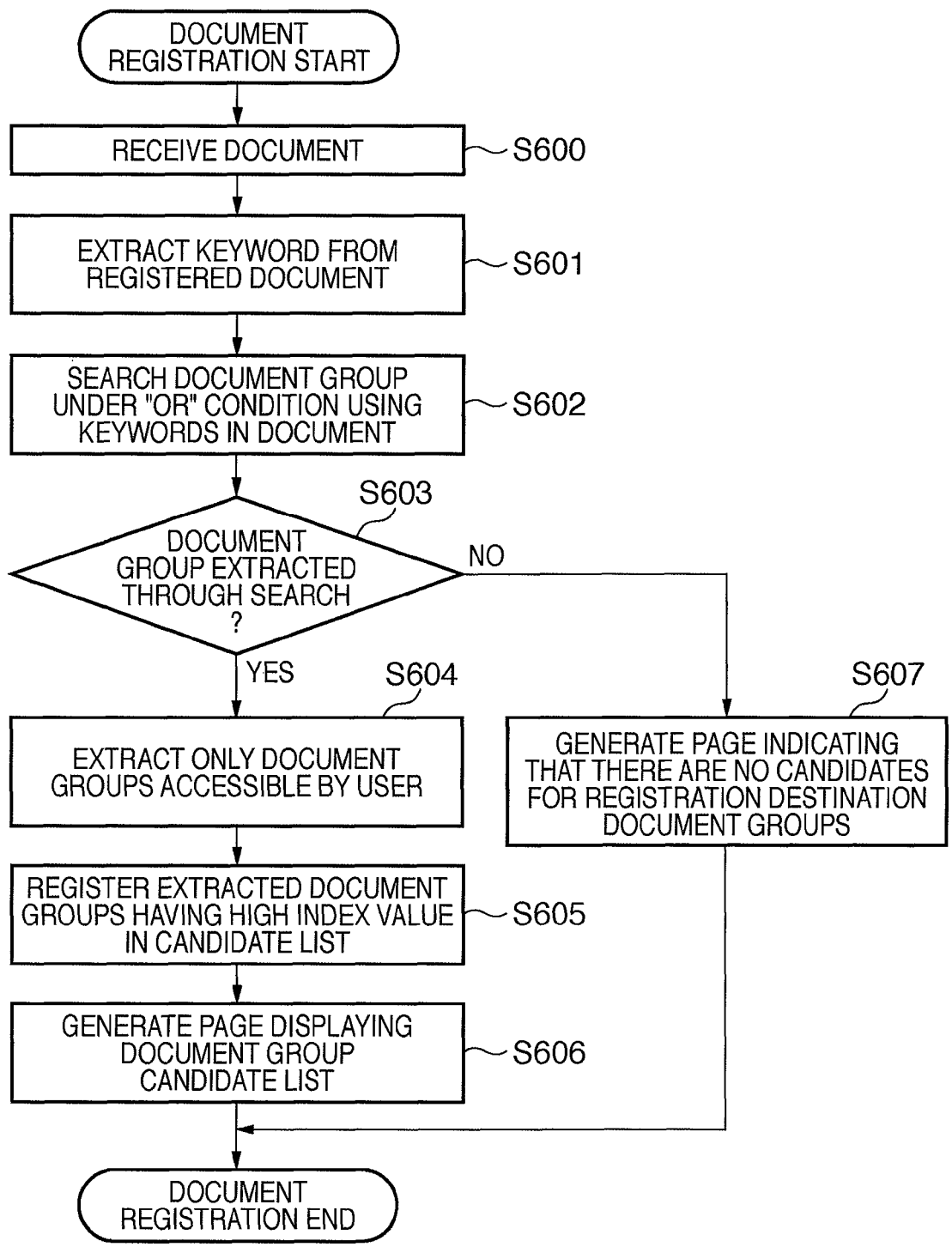
FIG. 17 is a flowchart illustrating a document group candidate list display process according to the third embodiment.

In the present embodiment, when a certain user accesses (logs into) the document management system via the browser of the client PC 10 and registers a document, the document management system displays a registration destination document group candidate list, taking into consideration keywords included in the document. FIG. 16 is a diagram illustrating an outline of a document group candidate list display process performed by the document management system according to the third embodiment. Meanwhile, FIG. 17 is a flowchart illustrating the document group candidate list display process performed by the document management system according to the third embodiment. The following detailed descriptions shall refer to FIGS. 16 and 17. In step S600, when a document is registered, the main control unit 200 receives the document (the document name being "Doc1") via the data sending/receiving unit 201. Then, the main control unit 200 saves the document in association with session information in the session storage unit 202, for the time being. In step S601, the main control unit 200 instructs the document information operation unit 400 to extract keywords from the registered document. A general, publicly-known method can be used as the method for extracting the keyword. In step S602, the document group search unit 403 instructs the document group information operation unit 402 to perform the following operations under "OR" conditions, based on instructions from the main control unit 200, and using the extracted keywords. First, the document group search unit 403 searches the document group information storage unit 406 for a document group that matches the conditions. Next, in step S603, in the case where the document group search unit 403 has found a document group that matches the conditions set forth in step S602, the process moves to step S604. In step S604, only the document groups that the user can access are extracted from the document group information storage unit 406. Then, in step S605, the document groups with high index values are taken from the extracted document groups and registered as a candidate list. In this case, all the extracted document groups may be displayed in order from highest index value down, or a threshold may be provided in order to limit the document group candidates that are displayed. In step S606, in the case where a document group candidate list exists, the main control unit 200 receives the document group candidate list extracted by the document group information operation unit 402. The main control unit 200 then instructs the web UI generation unit 203 to generate a page displaying the document group candidate list for document registration destinations. The generated page is then returned as a response to the client PC 10 via the data sending/receiving unit 201, and is displayed in the browser of the client PC 10.

According to the third embodiment, when registering a document, a user can determine a registration destination document group through the document management system displaying registration destination candidates (a candidate display), without having to determine the registration destination document group in advance by his/herself.

Figure 18:
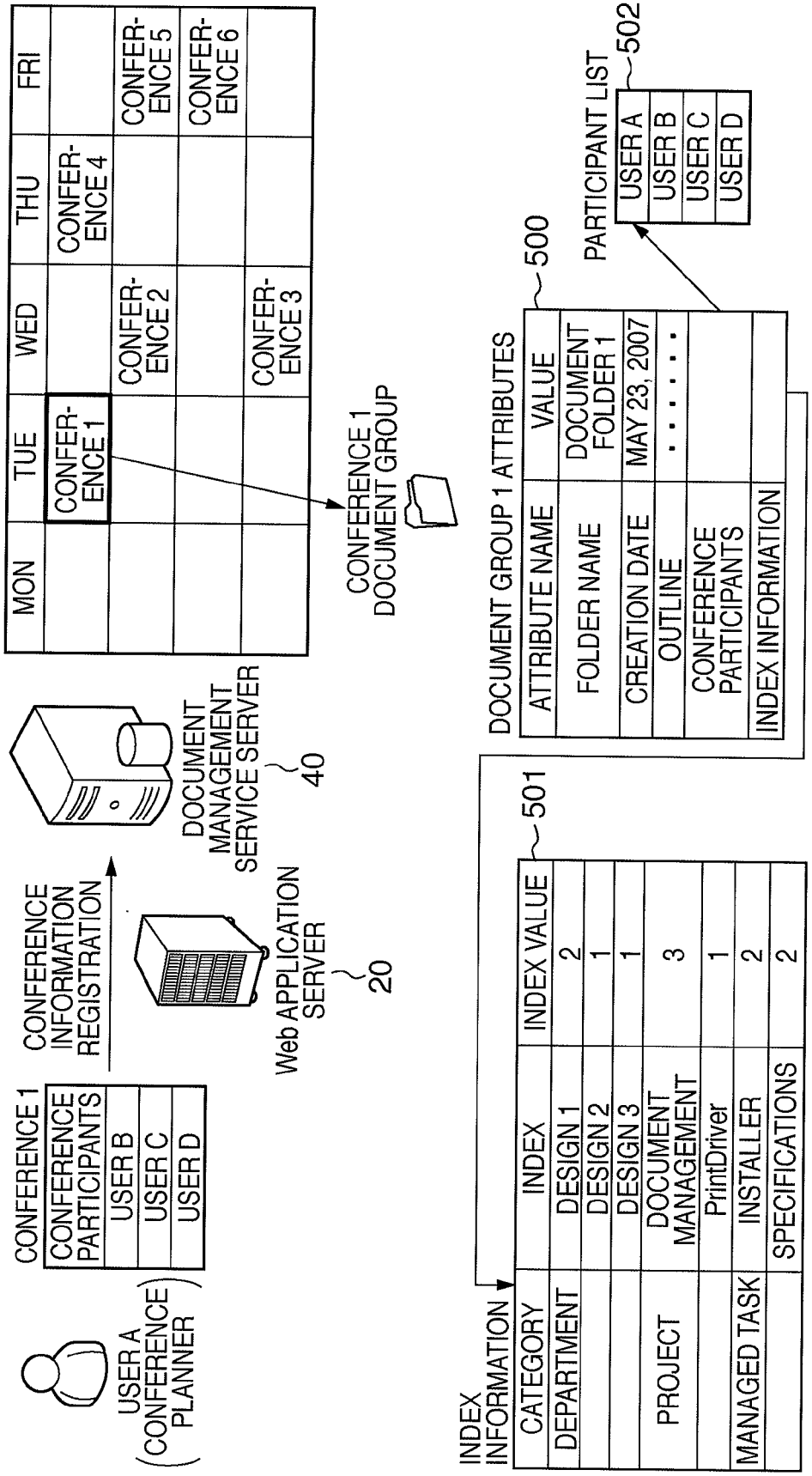
FIG. 18 is a diagram illustrating a fourth embodiment of the present invention.

FIG. 18 is a diagram illustrating a fourth embodiment of the present invention. In the present embodiment, index values are set based on user attributes included in the attributes of document groups, rather than through the registration of documents in document groups, the browsing of documents in document groups, and so on. For example, the present embodiment can be utilized as a scheduler, as shown in FIG. 18. In the present embodiment, in the case where information of conference participants is registered, in advance, as a list in a PC (server) that manages a schedule, the user attributes of the conference participants may be set as the initial values for attributes of a document group in which conference information is registered. To be more specific, as shown in FIG. 18, a conference participant list is inputted for conference information (here, this is conference 1) to be registered or already registered in the scheduler, and that conference participant list is registered in conference participant attributes 502 in the document group attributes 500 for the conference 1. Then, information is extracted from the user properties of the participants registered in the conference participant attributes 502, and is registered as index information 501 in the document group attributes for the conference 1. After this, as described earlier, document groups related to the user properties of a user who logs into a web application are then collected and displayed.

The present invention also includes a case where the functionality of the aforementioned embodiments is implemented by an operating system (OS) or the like running on a computer executing part or all of the actual processing based on instructions written in the code of a program (a document management program). Furthermore, the present invention can also be applied in the case where the program code read out from the storage medium is written into a memory provided in a function expansion card installed in the computer or a function expansion unit connected to the computer. In such a case, a CPU or the like provided in the functionality expansion card or the functionality expansion unit performs part or all of the actual processing based on the program code, and the functionality of the aforementioned embodiment is realized by that processing.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-031028, filed Feb. 12, 2008, which is hereby incorporated by reference herein in its entirety.

What is claimed is:

1. A document management apparatus that includes at least one processor configured to search at least one document group saved in advance for a document group having attributes that correspond to a search condition, the apparatus comprising:
 an updating unit configured to update the attributes of the document group in accordance with an operation performed by a user on a document in the document group; and
 a search unit configured to search for a document group having attributes that correspond to user information inputted from the exterior,
 wherein the attributes of the document group include at least one item, and
 each item has an index value indicating a weight, and
 the apparatus further comprises:
 a classification unit configured to classify document groups found by the search unit into the item, among the items, that has the index value that indicates the highest weight; and
 a display unit configured to display the document group so as to be identifiable based on classification along with the item into which the document group was classified by the classification unit.

2. The document management apparatus according to claim 1, wherein the operation performed by a user on a document in the document group is one of registering a document in a document group, browsing a document included in a document group, and updating a document included in a document group.

3. The document management apparatus according to claim 1, wherein the updating unit updates the attributes of the document group based on one or both of the user information of the user and a keyword set for the document, in accordance with an operation performed on the document in the document group by the user.

4. The document management apparatus according to claim 1,
 wherein, in accordance with an operation having been performed by a user on a document in a document group,
 in a case where information included in one or both of the user information of the user and a keyword set for the document is not included as an item in the attributes of the document group, the updating unit adds that information as a new item in the attributes of the document group; and
 in a case where information included in one or both of the user information of the user and a keyword set for the document is included as an item in the attributes of the document group, the updating unit updates the index value of the item in the document group that corresponds to that information.

5. The document management apparatus according to claim 1, further comprising:
 an extraction unit configured to extract a keyword set for a document when the document is registered in a document group by a user; and
 a candidate display unit configured to search for a document group that has attributes corresponding to the keyword and displays the document groups that have been found as registration destination candidates for the document.

6. A document management method for a document management apparatus that searches at least one document group saved in advance for a document group having attributes that correspond to a search condition, the method comprising the steps of:
 updating the attributes of the document group in accordance with an operation performed by a user on a document in the document group; and
 searching for a document group having attributes that correspond to user information inputted from the exterior,
 wherein the attributes of the document group include at least one item, and each item has an index value indicating a weight, and
 the method further comprises the steps of:
 classifying document groups found in the search step into the item, among the items, that has the index value that indicates the highest weight; and
 displaying the document group so as to be identifiable based on classification along with the item into which the document group was classified in the classifying step.

7. The document management method according to claim 6, wherein the operation performed by a user on a document in the document group is one of registering a document in a document group, browsing a document included in a document group, and updating a document included in a document group.

8. The document management method according to claim 6, wherein in the step of updating, the attributes of the document group are updated based on one or both of the user information of the user and a keyword set for the document, in accordance with an operation performed on the document in the document group by the user.

9. A computer-readable storage medium on which is stored a document management program for searching at least one document group saved in advance for a document group having attributes that correspond to a search condition, the program causing a computer to function as:
 an updating unit configured to update the attributes of the document group in accordance with an operation performed by a user on a document in the document group; and
 a search unit configured to search for a document group having attributes that correspond to user information inputted from the exterior,
 wherein the attributes of the document group include at least one item, and each item has an index value indicating a weight, and
 the program further causes the computer to function as:
 a classification unit configured to classify document groups found by the search unit into the item, among the items, that has the index value that indicates the highest weight; and
 a display unit configured to display the document group so as to be identifiable based on classification along with the item into which the document group was classified by the classification unit.

10. A document management system that includes at least one processor configured to search at least one document group saved in advance for a document group having attributes that correspond to a search condition, the system comprising:

a display unit configured to display a document group having attributes that correspond to user information of a user that uses the document management system; and
an updating unit configured to update the attributes of the document group displayed by the display unit, in accordance with an operation having been performed by a user on a document
wherein the attributes of the document group include at least one item, and each item has an index value indicating a weight, and
the system further comprises:
a classification unit configured to classify document groups displayed by the display unit into the item, among the items, that has the index value that indicates the highest weight,
wherein the display unit is configured to display the document group so as to be identifiable based on classification along with the item into which the document group was classified by the classification unit.

11. A document management method that searches at least one document group saved in advance for a document group having attributes that correspond to a search condition, the method comprising the steps of:
displaying a document group having attributes that correspond to user information of a user that uses a document management system; and
updating the attributes of the document group displayed in the step of displaying, in accordance with an operation having been performed by a user on a document,
wherein the attributes of the document group include at least one item, and each item has an index value indicating a weight, and
the method further comprises the steps of:
classifying document groups displayed in the displaying step into the item, among the items, that has the index value that indicates the highest weight,
wherein in the displaying step the document group is displayed so as to be identifiable based on classification along with the item into which the document group was classified in the classifying step.

* * * * *